United States Patent [19]

Alff

[11] Patent Number: 5,451,869

[45] Date of Patent: Sep. 19, 1995

[54] SENSOR BEARING WITH CLIP-ON SENSOR

[75] Inventor: Denis Alff, Annecy, France

[73] Assignee: The Torrington Company, Torrington, Conn.

[21] Appl. No.: 169,916

[22] Filed: Dec. 20, 1993

[30] Foreign Application Priority Data

Apr. 9, 1993 [FR] France .................. 93 04237

[51] Int. Cl.6 ........................ G01P 3/481; F16C 32/00
[52] U.S. Cl. ...................... 324/173; 384/448
[58] Field of Search ........... 324/160, 173, 174, 207.25, 324/207.13, 207.11, 166; 384/448

[56] References Cited

U.S. PATENT DOCUMENTS

| 4,907,445 | 3/1990 | Okumura | 324/173 |
| 4,946,296 | 8/1990 | Olschewski et al. | 384/448 |
| 5,011,302 | 4/1991 | Mott et al. | 324/207.25 |
| 5,011,303 | 4/1991 | Caron | 384/448 |
| 5,103,170 | 4/1992 | Grillo et al. | 384/448 |
| 5,140,261 | 8/1992 | Seo et al. | 324/207.25 |
| 5,143,458 | 9/1992 | Alff et al. | 384/448 |

FOREIGN PATENT DOCUMENTS

0511105A1 10/1992 European Pat. Off. .
0511107A1 10/1992 European Pat. Off. .

Primary Examiner—Sandra L. O'Shea
Assistant Examiner—Roger Phillips
Attorney, Agent, or Firm—John C. Bigler

[57] ABSTRACT

A stationary bearing ring, a rotatable bearing ring, and a sensor support having a slide are provided. The sensor support is axially retained in engagement with the stationary bearing ring, and a sensor is slidably mounted in the slide of the sensor support. The sensor is biased into contact with the sensor support and is radially retained in the slide. An encoding element is carried by the rotatable bearing ring and is rotatable in front of the sensor. Various embodiments are disclosed.

10 Claims, 6 Drawing Sheets

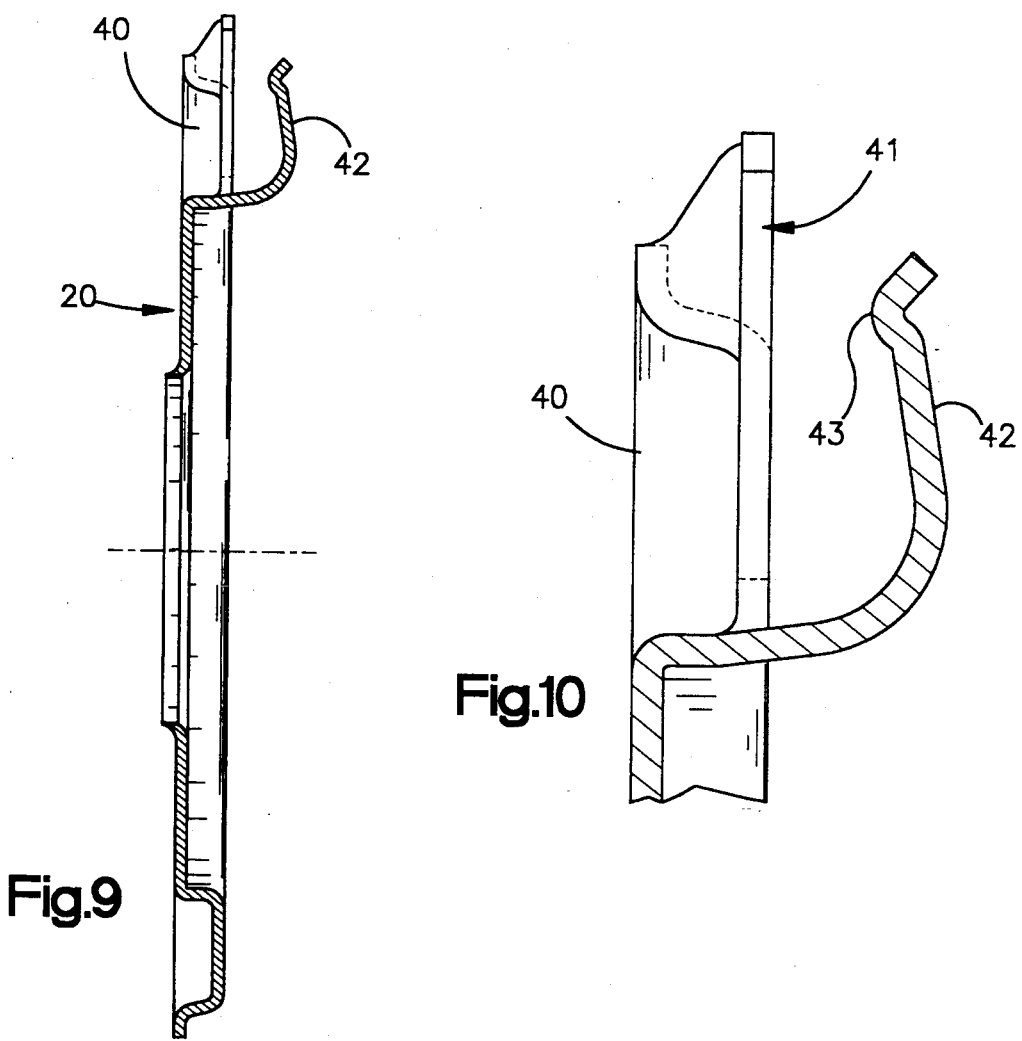
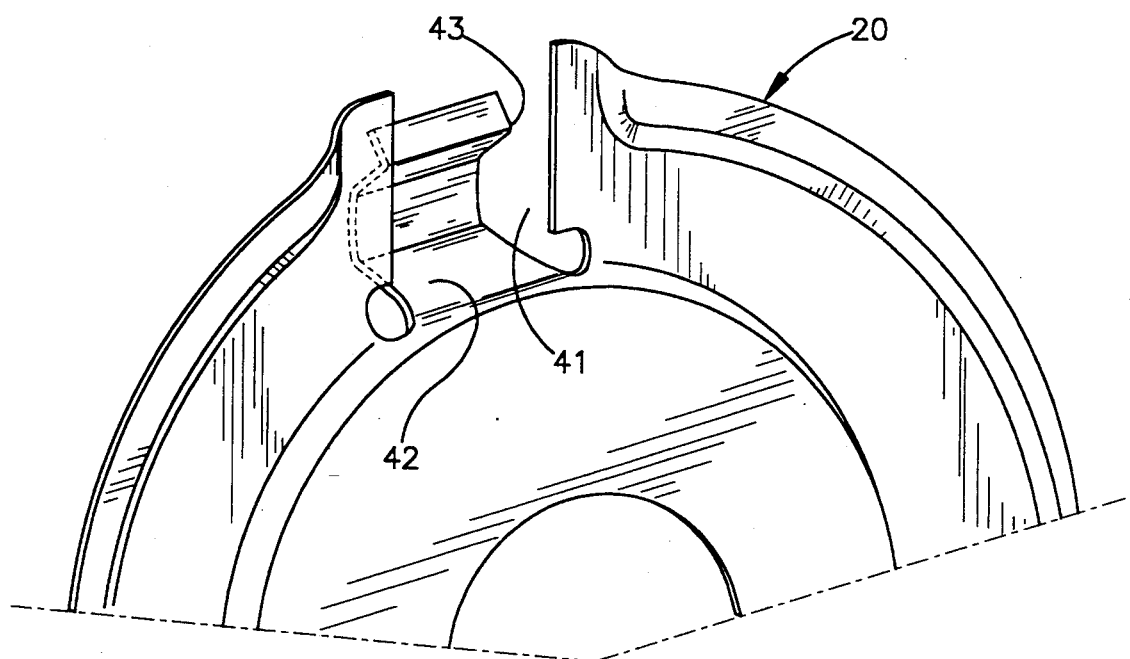

SENSOR BEARING WITH CLIP-ON SENSOR

BACKGROUND OF THE INVENTION

This invention relates generally to a rolling bearing and, more particularly, to a bearing equipped with a data sensor device which can be oriented and which includes an encoding element moveable in front of a sensor mounted on a sensor support.

Reference EP-A 453,331 describes a bearing having a sensor support which has machined parts and carries means for fastening a sensor by a hook engaging a bearing ring. The present invention relates to a simplification of the construction of such a sensor support.

The foregoing illustrates limitations known to exist in present roller bearings with sensors. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a bearing having a data sensor device comprising a stationary bearing ring, a rotatable bearing ring, a sensor support having a slide, and axial positioning means on the sensor support in engagement with the stationary bearing ring for axially retaining the sensor support. A sensor is slidably mounted in the slide of the sensor support, and clamping means is provided for biasing the sensor into contact with the sensor support and for radially retaining the sensor in the slide. An encoding element is carried by the rotatable bearing ring and is rotatable in front of the sensor.

The foregoing and other aspects will become apparent from the following detailed description of the invention when considered in conjunction with the accompanying drawing figures.

BRIEF DESCRIPTION OF THE DRAWING FIGURES

FIG. 8 is a front view of a sensor and sensor support illustrating a fourth embodiment of the present invention;

FIG. 9 is a radial cross-section of a sensor support illustrating a fifth embodiment of the present invention;

FIG. 10 is an enlarged partial cross-section of the sensor support of FIG. 9; and FIG. 11 is a perspective view illustrating a portion of the sensor support of FIG. 9.

DETAILED DESCRIPTION

Figure 1:
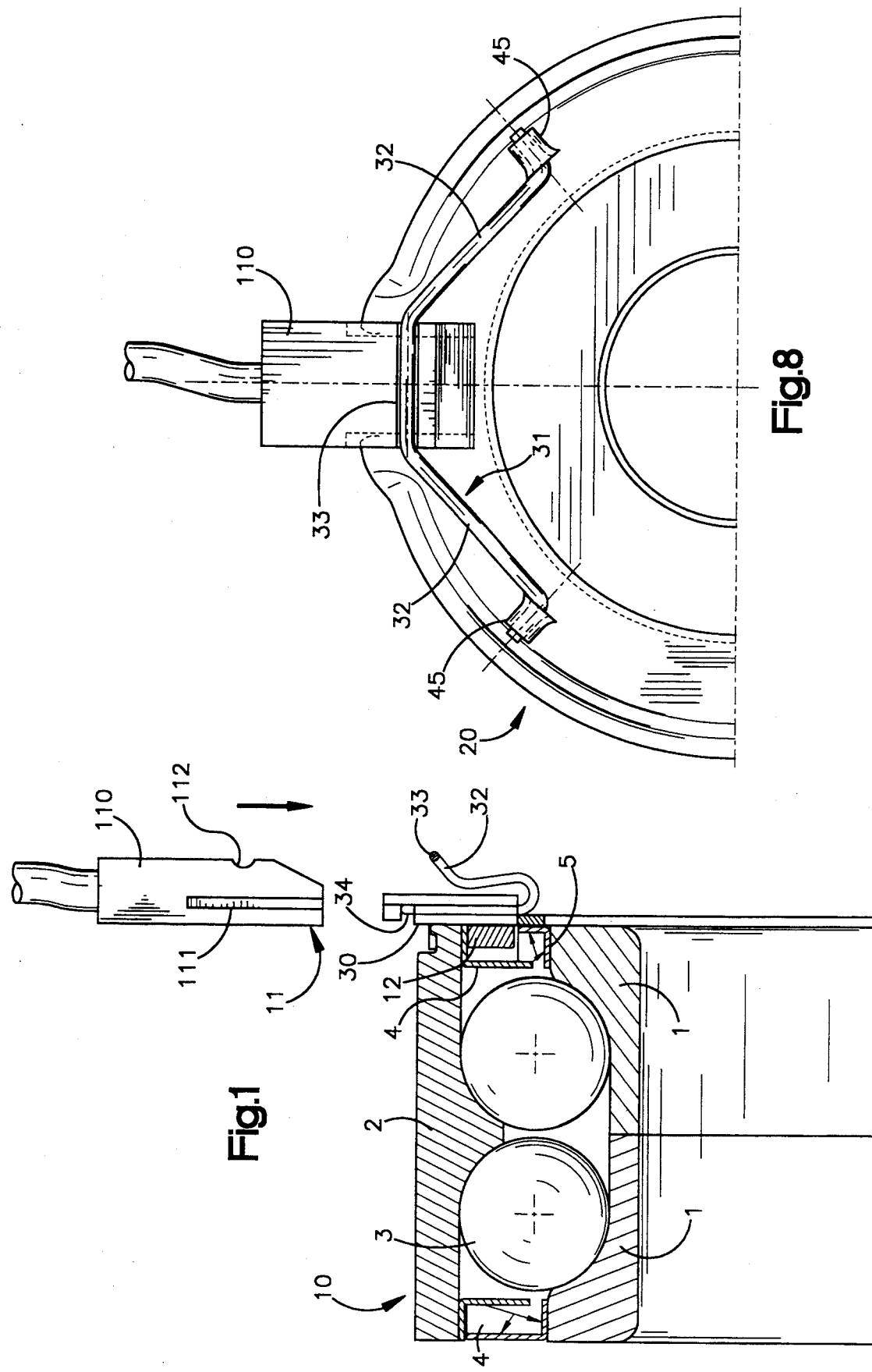
FIG. 1 is an axial cross-section along line I of FIG. 2 of a bearing equipped with a sensor support illustrating a first embodiment of the present invention.
Figure 2:
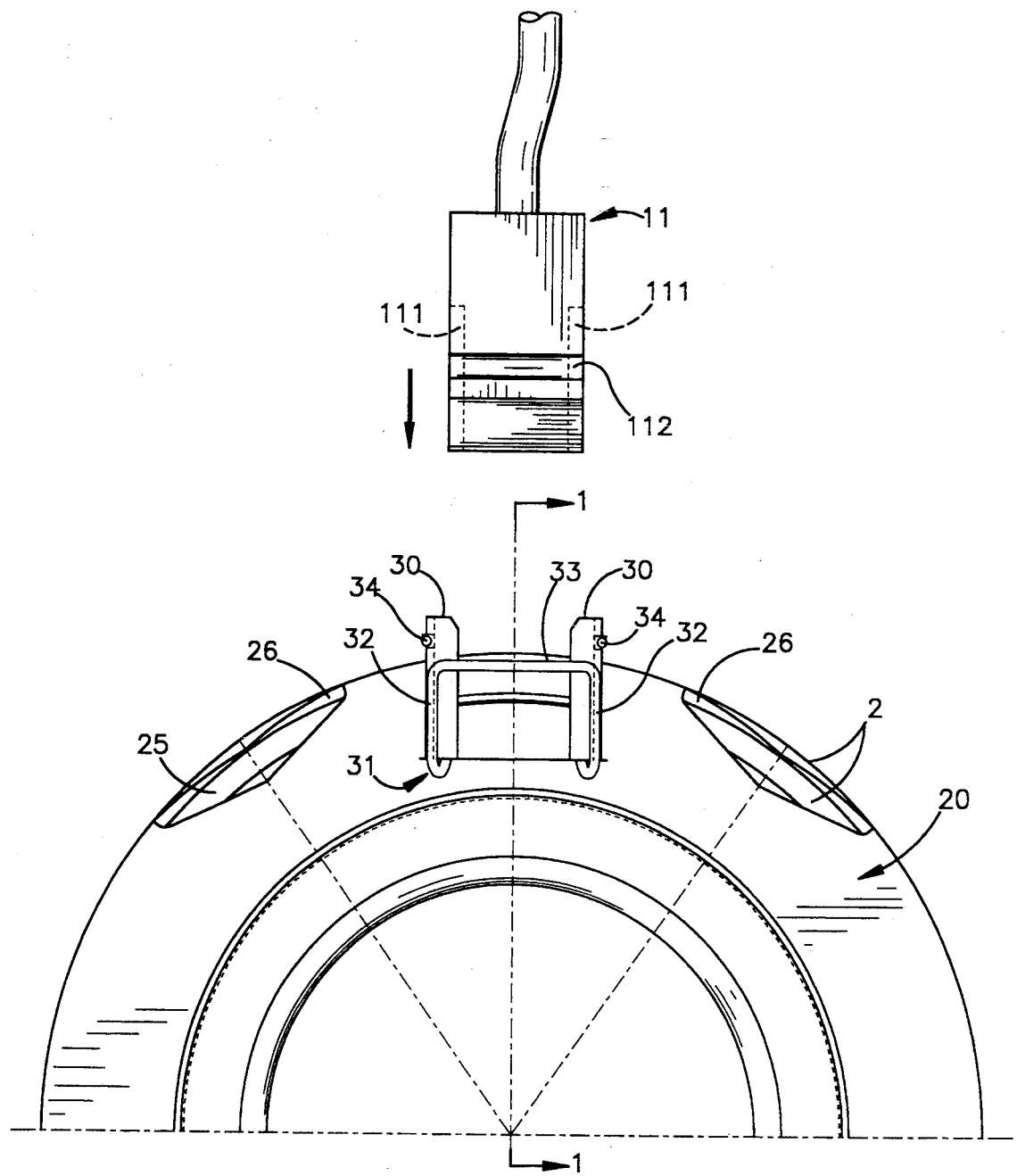
FIG. 2 is a partial front view of the bearing shown of FIG. 1.

Referring now to the drawings, FIGS. 1 and 2 illustrate a bearing 10 having an internal rotatable bearing ring 1 divided into two parts, an external stationary bearing ring 2, and rolling elements 3 positioned between the bearing rings. The bearing 10 may be sealed, for example by means of two fittings 4 with preassembled sealing lips as described in reference FR-A 2,505,951. The bearing 10 is intended to be used as a bearing in conventional assemblies, such as those described in reference EP-A 453,331.

A data sensor device of the present invention comprises a sensor 11 and an encoding element 12, which is integrally connected so that encoding element 12 rotates with the rotatable bearing ring 1 by means of a deflector 5 of the sealing fitting 4. The sensor 11 is contained in a mounting head 110 whose sides perform the function of guidance, for example by means of grooves 111. The front side of the head 110 carries a transverse groove 112 intended to receive a retention and positioning rib of the mounting head 110 of the sensor 11 on a ring-shaped sensor support 20 whose embodiment variants are shown in FIGS. 4 and 9.

Figure 3:
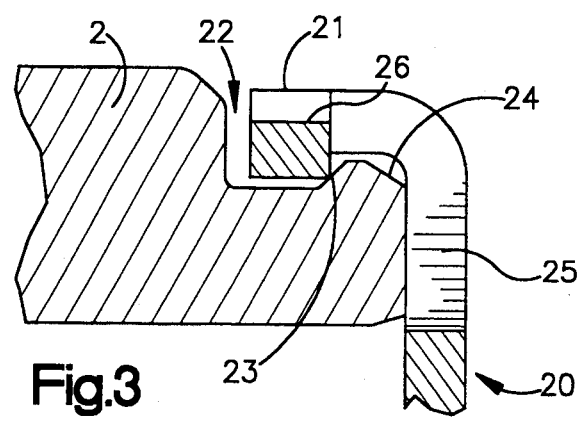
FIG. 3 is an enlarged cross-sectional view of the bearing of FIG. 1 showing the mounting zone of the sensor support on the bearing ring.
Figure 4:
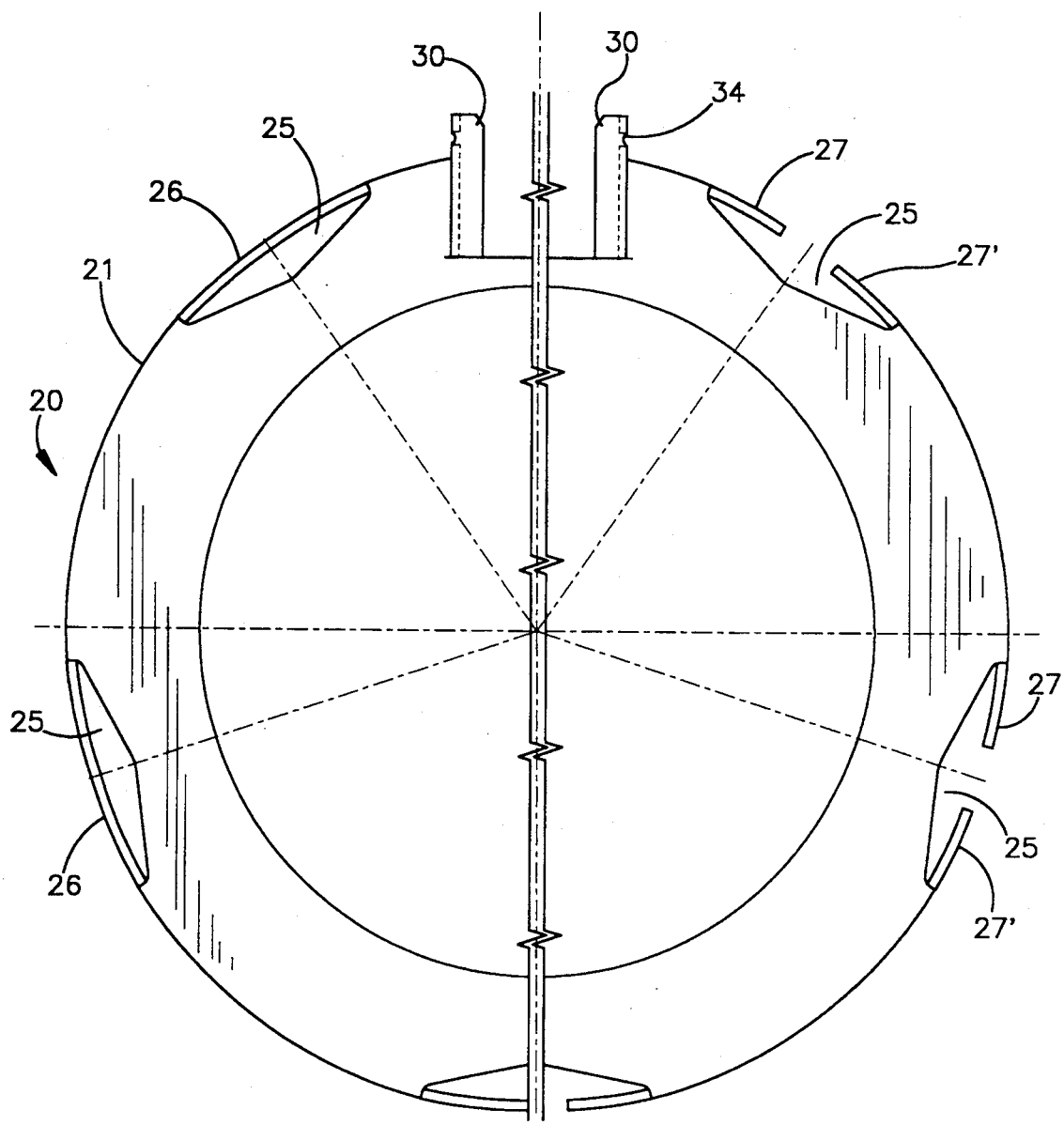
FIG. 4 is a front view of a sensor support illustrating first and second embodiments of the present invention.

According to FIG. 4, the sensor support consists of a ring-shaped disk made of cut sheet metal whose external edge 21 is folded axially to cover its circular mounting bearing surface limited by the lateral side of the stationary bearing ring 2. For this purpose and according to FIG. 3, the stationary bearing ring 2 carries a machined groove 22 which is limited axially by a conical abutment surface 23 which extends axially from an assembly ramp 24 with conical surface whose external diameter is adjacent to the bearing surface 23.

According to a first embodiment of the sensor support 20, the latter has zones 25 which are cut by punching, and which are distributed angularly at the periphery of the disk and at the surface of its external margin 21. The axial extremity of the margin 21 thus delimits with each zone such as 25 a resilient bar 26 for the axial positioning of the sensor support 20 in contact with the stationary bearing ring, which is bent radially in the direction of the bottom of the groove 22.

The right hand side of FIG. 4 shows bars sectioned into two parts to form attachment tabs 27, 27' which are bent along the cord of the cut zone 25 and which also ensure the axial positioning of the sensor support 20 in contact with the stationary bearing ring. The left hand side of FIG. 4 shows resilient bars 26 which are bent as before and which provide a radial force of the bar 26 in the groove 22. As shown in FIG. 4, the sensor support 20 carries a slide 30 for mounting the grooved head of the sensor 11. The parallel margins of the slide 30 are made by punching and symmetrical folding of two small tongues of tabs formed in the ring-shaped part of the sensor support 20.

To immobilize the sensor 11 on the sensor support 20, a clamp 31 is used, which is made of a spring wire whose resilient branches 32 are segments of wire which have been folded and are attached to the sensor support 20 at the extremity of the slide 30. A portion 33 of the clamp 31 extends between the branches 32 and constitutes a retention rib of the head 110 of the sensor in contact with the groove 112. As shown in FIG. 2, each branch 32 extends in part starting from its point of attachment 34 along the rear of the slide 30, then at the front of the slide 30 to define together with the rib 33 the clamping means for biasing the sensor 11 into contact with the sensor support 20.

Figure 5:
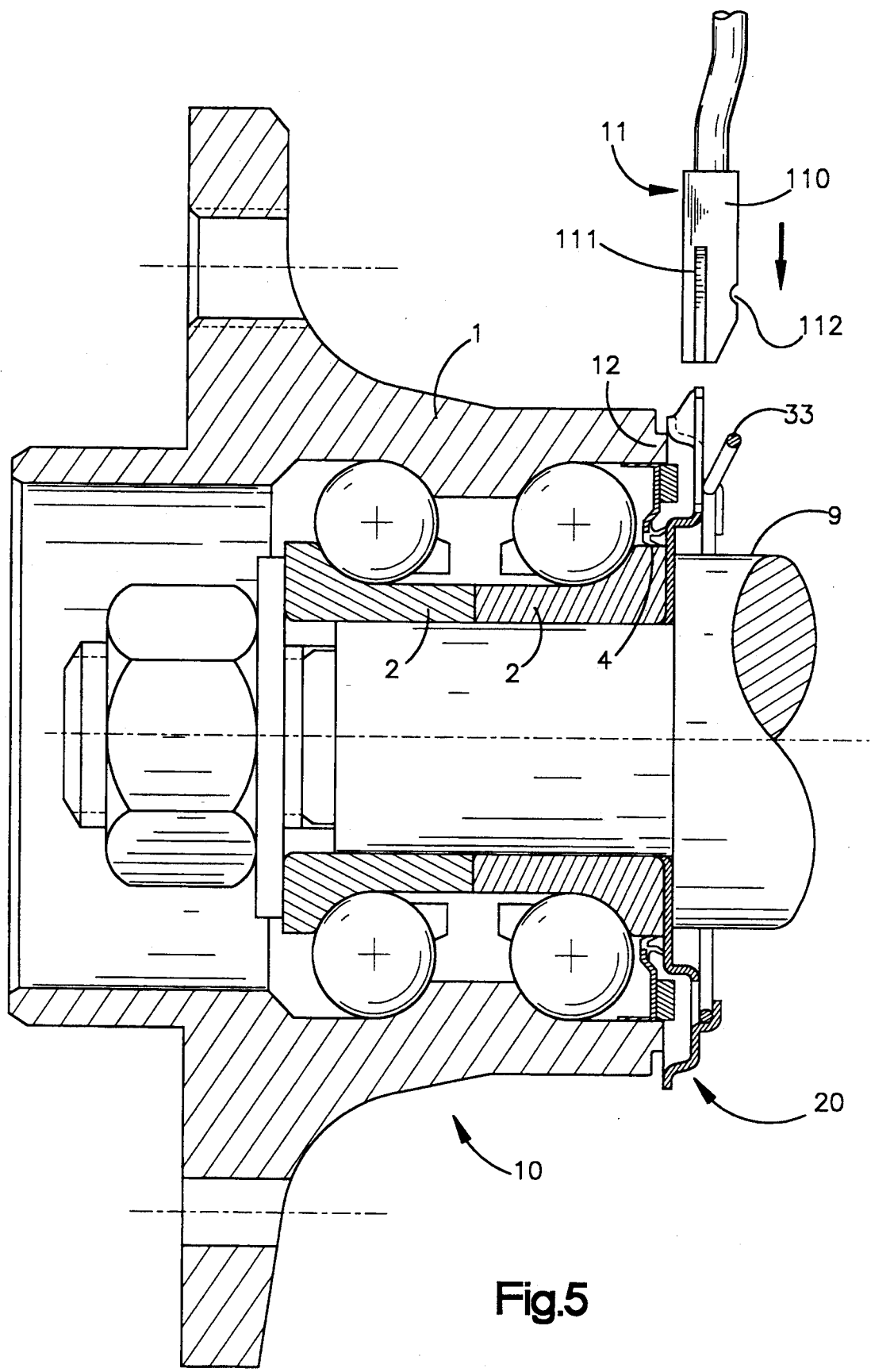
FIG. 5 is an axial cross-sectional view of a bearing and sensor support illustrating a third embodiment of the present invention.

FIG. 5 describes an embodiment variant of the bearing equipped with the sensor device. The external rotating bearing ring 1 is made of a single piece while the stationary internal ring 2 is made of two parts. FIG. 5 and FIGS. 6 through 10 are more specifically directed to the ring-shaped sensor support 20 and show the elements and devices already described with reference to FIGS. 1 and 2 and, therefore, have the same reference numbers.

As has been shown more particularly in FIGS. 5, 9, 10 and 11, the sensor support 20 may be made by embossing and punching. The sensor support 20 may be mounted temporarily on the bearing 10 together with the sensor 11. For this purpose, the side of the sensor support 20 turned towards the bearing may be cemented onto the bearing ring 2 for facilitating the mounting of the bearing equipped with the sensor device directly on a carrying shaft 9.

The head 110 of the sensor is mounted on the sensor support 20 which has a ring-shaped groove 40 which is embossed on the surface of the sensor support 20 as shown in FIGS. 9 and 11. The bottom of the groove 40 is punched locally and has a cut-out section 41 to which are connected a small tongue and resilient tabs 42 whose extremity carries a protrusion or a rib 43 for radial retention of the head 110 of the sensor in contact with the groove 112. In this configuration the lateral parallel margins of the cut-out section 41 constitute slides for the mounting of the head 110. The radial retention of the head 110 is achieved as described with reference to FIGS. 1 and 2.

Figure 6:
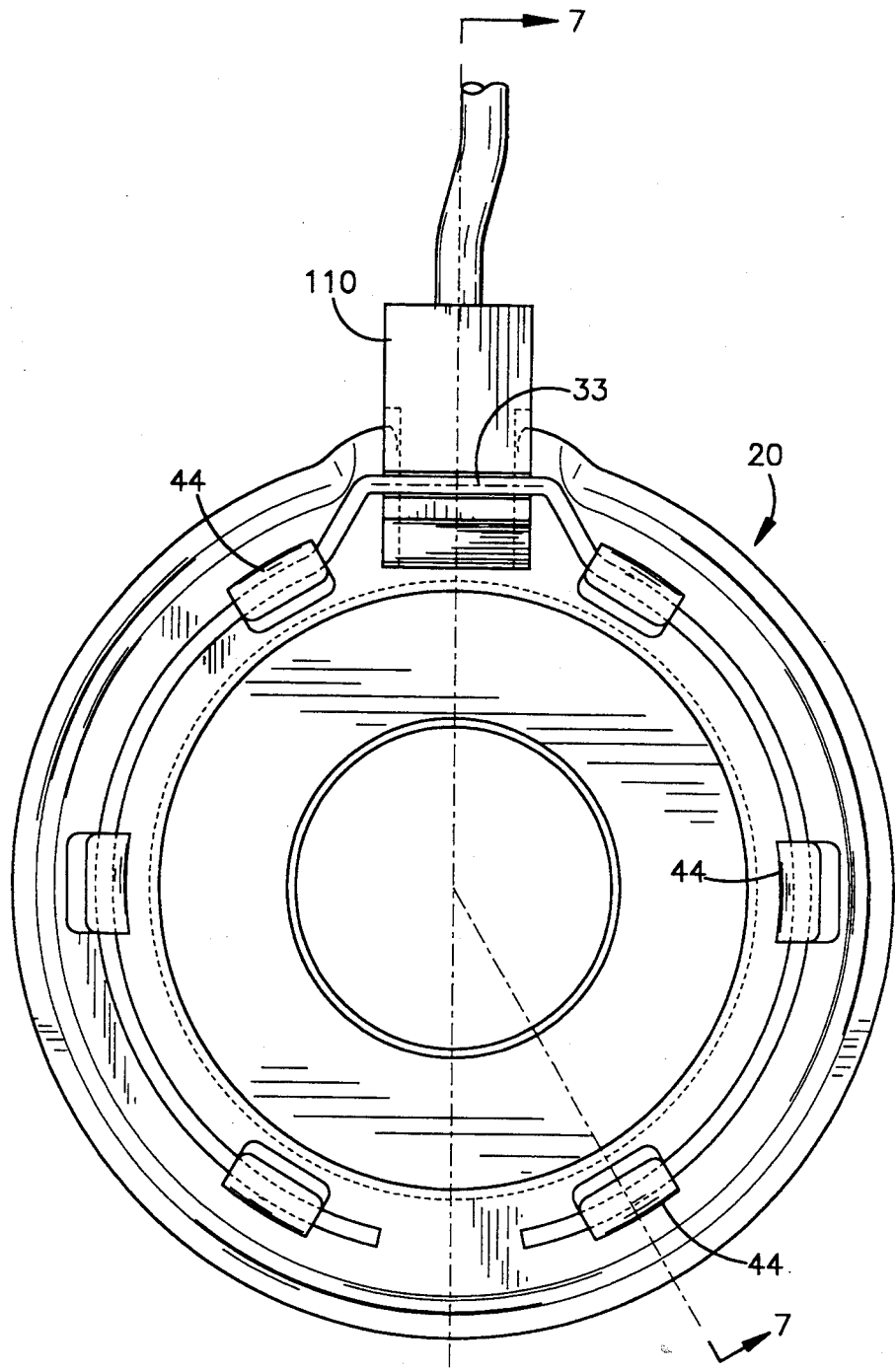
FIG. 6 is a front view of the sensor and sensor support of FIG. 5.
Figure 7:
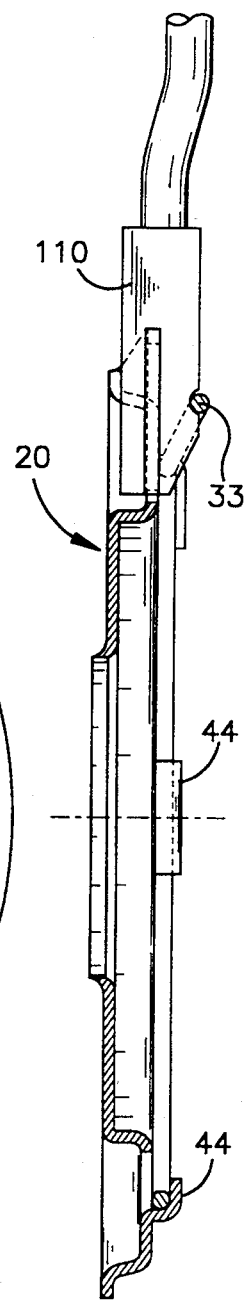
FIG. 7 is a cross-sectional view of the sensor and sensor support of FIG. 5 taken along the line VII—VII of FIG. 6.

FIG. 6 describes a retention segment 33 of the sensor head 110. The segment 33 is part of an expandable resilient ring engaging mounting tabs 44 distributed circumferentially on the front of the sensor support 20 and intended to retain portions of spring wire distributed at the periphery of the ring. According to FIG. 8, the segment 33 is a part of the spring wire which is shaped and carries attachment segments 45 of the branches 32 in contact with the sensor support 20.

As shown in the drawing, all the retention means of the sensor, such as the resilient bars 26 and the small tongues or resilient tabs 42, may be formed by local deformation of the constitutive material of the sensor support 20 during conventional punching operations.

According to the present invention, the sensor support carries means for axial positioning in contact with the stationary bearing ring. Clamping means is provided for maintaining contact of the sensor with the sensor support and for radial immobilization of the sensor in the slide. The sensor support may consist of a ring-shaped disk which has cut-out zones and functional deformations which are located in said zones for the purpose of immobilizing and positioning the sensor in the slide.

Having described the invention, what is claimed is:

1. A bearing having a data sensor device comprising:
a stationary bearing ring;
a rotatable bearing ring;
a sensor support comprising a ring-shaped disk having cut-out zones and a slide;
axial positioning means on the sensor support comprising a resilient portion at said zones in engagement with the stationary bearing ring such that said sensor support is restrained axially with respect to the stationary bearing ring;
a sensor slidably mounted in the slide of the sensor support;
clamping means for biasing the sensor into contact with the sensor support and for radially retaining the sensor in the slide; and
an encoding element carried by the rotatable bearing ring and rotatable in front of the sensor.

2. The bearing according to claim 1, wherein the stationary bearing ring has a groove and wherein the cut-out zones of the disk are angularly distributed at the periphery of the disk and delimited by resilient portions which are directed radially into said groove.

3. The bearing according to claim 2, wherein the clamping means includes a clamp on the sensor support in engagement with the sensor.

4. The bearing according to claim 3, wherein the clamp is formed by a protion of spring wire which is shaped and carries segments for attachment on the sensor support.

5. The bearing according to claim 4, wherein the spring wire includes branches anchored on the disk.

6. The bearing according to claim 1, wherein the clamping means includes an expandable ring in engagement with mounting tabs which are distributed circumferentially on the sensor support.

7. The bearing according to claim 3, characterized by the fact that the clamp for retention of the sensor comprises a resilient tab on the sensor support oriented towards the sensor.

8. The bearing according to claim 1, wherein the slide of the sensor support is formed by localized punching operations on the surface of the sensor support.

9. The bearing according to claim 3, wherein the clamp is formed by localized punching operations on the surface of the sensor support.

10. A bearing having a data sensor device comprising:
a stationary bearing ring;
a rotatable bearing ring;
a sensor support having a slide, the slide having edges;
axial positioning means on the sensor support in engagement with the stationary bearing ring for axially retaining the sensor support;
a sensor slidably mounted in the slide of the sensor support, the sensor having grooves receiving the edges of the slide such that the sensor can slide radially during assembly of the bearing;
clamping means for biasing the sensor in to contact with the sensor support and for radially retaining the sensor in the slide; and
an encoding element carried by the rotatable bearing ring and rotatable in front of the sensor.

* * * * *